Sept. 20, 1949.  A. B. JACOBSEN  2,482,544
PULSE CODE OPERATED ELECTRONIC RANGE INDICATOR
Filed May 2, 1945  2 Sheets-Sheet 1

INVENTOR.
ANDREW B. JACOBSEN
BY
William D. Hall.
ATTORNEY

Sept. 20, 1949. A. B. JACOBSEN 2,482,544
PULSE CODE OPERATED ELECTRONIC RANGE INDICATOR
Filed May 2, 1945 2 Sheets-Sheet 2
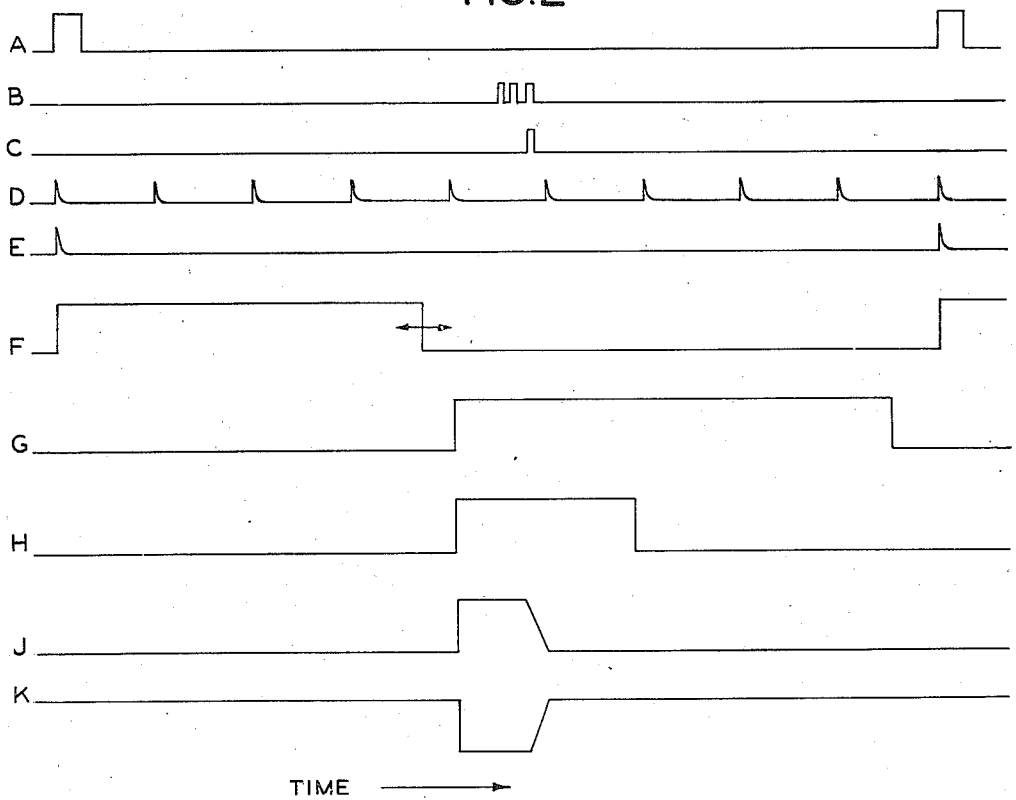
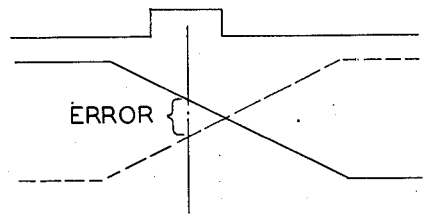
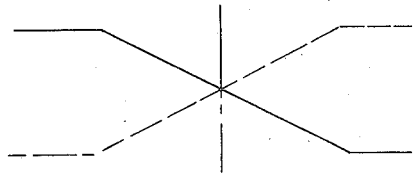
INVENTOR.
ANDREW B. JACOBSEN
BY
ATTORNEY Patented Sept. 20, 1949

2,482,544

UNITED STATES PATENT OFFICE 2,482,544

PULSE CODE OPERATED ELECTRONIC RANGE INDICATOR

Andrew B. Jacobsen, Somerville, Mass., assignor, by mesne assignments, to the United States of America as represented by the Secretary of War Application May 2, 1945, Serial No. 591,587

3 Claims. (Cl. 250—27)

1

My invention relates in general to radio circuits and more particularly to those circuits used in the reception and interpretation of transmissions from certain types of radio navigational aids.

In the navigation of airplanes or ships, knowledge of the craft's location relative to fixed geographic or marine objects such as mountains, shorelines, or reefs is of prime importance. Such information can be gained by a process of triangulation employing at least two stationary radio beacon transmitting stations, the position of which is marked on the navigator's charts, and a radio receiving system with directional characteristics on board the navigable craft.

More recently systems have been developed in which a single fixed beacon station, upon receipt of an interrogating signal from a transmitter in a ship or airplane, radiates a signal, which may be in the form of short pulses of electromagnetic energy in a predeterminable sequence or code characteristic of the particular emitter. A directional antenna associated with the mobile receiver facilitates determination of the bearing of the fixed transmitter from the moving ship or plane. The pulse sequence identifies the particular radiating station, and the range or distance to the transmitter can be found by measurement of the time required for radio waves to travel between the transmitter and receiver. The information thus gained is sufficient to allow calculation of the moving craft's position.

Accordingly, it is one object of my invention to provide means for distinguishing between transmissions from separate fixed stations as described above according to the coding of such transmission.

Another object of my invention is to provide a circuit which will give a direct indication of the range to the fixed transmitter.

Still another object is to provide circuits which will automatically search for the fixed transmitter over a predetermined range of several miles.

Briefly, the invention utilizes a delay line decoder from which positive pulses are derived to gate a coincidence circuit. The coincidence circuit cannot operate unless signals in a predetermined sequence are applied to the decoder. Voltages varying linearly with time are also applied to the coincidence circuit. An error signal is developed in the coincidence circuit if the linearly varying voltage does not bracket the pulses derived from the delay line correctly. This signal is proportional to range and can be used with an indicating means.

2

The operation of the invention will be more apparent upon reference to the following specification, claims, and drawings, in which:

Fig. 2 is a compilation of voltage waveforms present at various points in the circuit;

Fig. 3 shows how an error signal is developed from incorrect bracketing in the coincidence circuit; and Fig. 4 shows correct bracketing.

Figure 1:
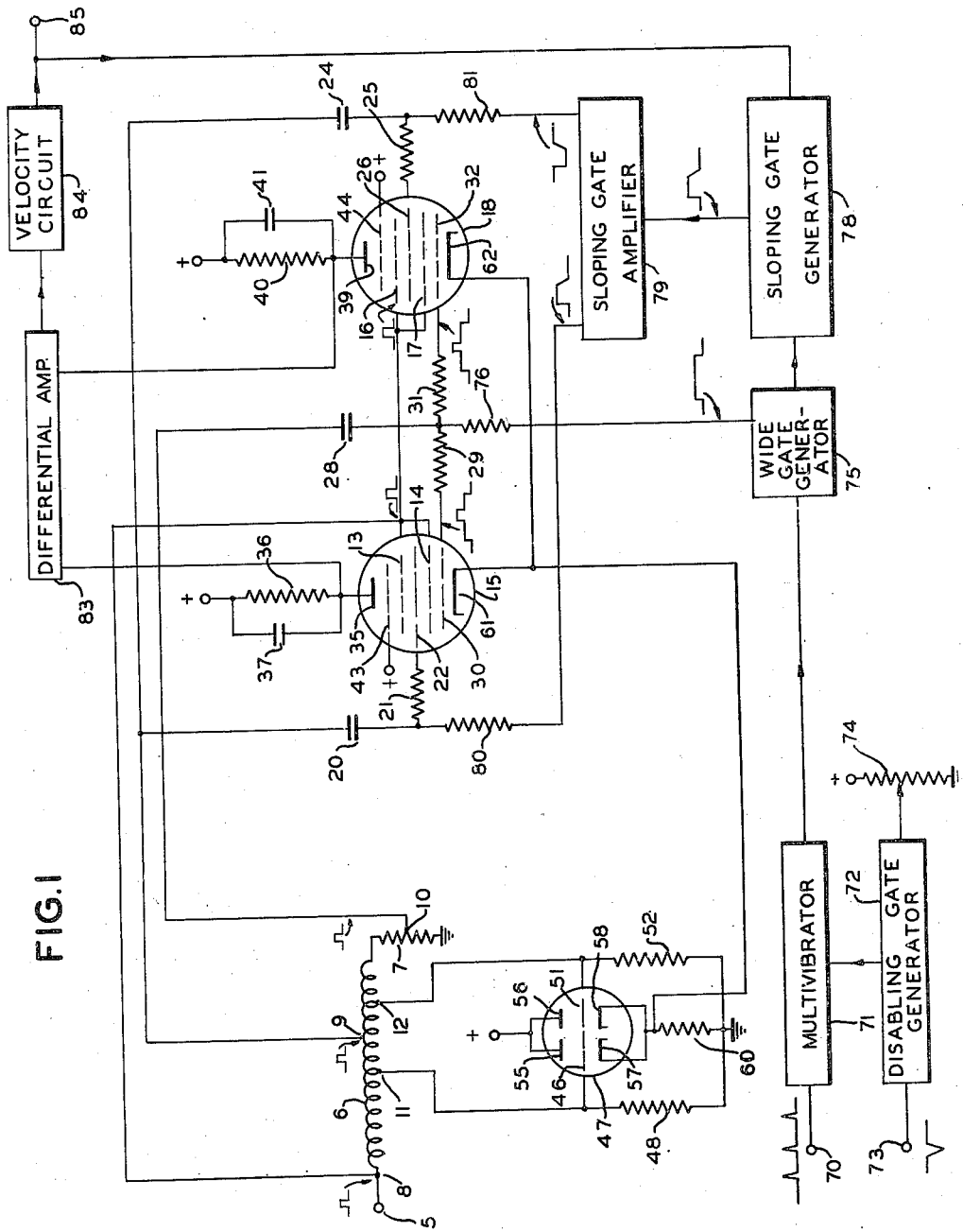
Fig. 1 is a diagram of one embodiment of the present invention.

Referring now to Fig. 1, to terminal 5 is connected a delay line 6 of any appropriate type. Delay line 6 is terminated in resistance 7 which is equal to the characteristic impedance of the delay line.

Tap 8 is connected to grids 13 and 14 of a multigrid vacuum tube 15, and to grids 16 and 17 of a similar vacuum tube 18. These vacuum tubes are part of a coincidence circuit. Tap 9 is connected through blocking capacitor 20 and resistor 21 to grid 22 of tube 15, and also through blocking capacitor 24 and resistor 25 to grid 26 of tube 18. A third tap 10 is connected through capacitor 28 and resistor 29 to grid 30 of vacuum tube 15, connection being made from the junction of capacitor 28 and resistor 29 to resistor 31 and thence to grid 32 of vacuum tube 18.

Anode 35 of tube 15 is connected to load resistor 36 which in turn is tied to a suitable source of positive potential, resistor 36 being bypassed by capacitor 37. Similarly anode 39 of tube 18 is connected through load resistor 40 to a source of positive voltage which may or may not be the same one which supplies tube 15. Resistor 40 is bypassed by capacitor 41. Grid 43 of tube 15 and grid 44 of tube 18 are biased positively by a suitable voltage source.

Tap 11 on delay line 6 is connected to grid 46 of double triode 47, a grid-return resistor 48 being connected between grid 46 and ground. Tap 12 on delay line 6 is connected to grid 51 of the other half of double triode 47, resistor 52 functioning as a grid-return resistor. Anodes 55 and 56 are tied together and connected to a source of steady positive voltage. Cathodes 57 and 58 are also tied together and connected to ground through resistor 60. Resistor 60 also serves as a cathode resistor for tubes 15 and 18, since cathode 61 of tube 15 and cathode 62 of tube 18 are connected directly to cathodes 57 and 58 of tube 47.

The invention also includes certain circuits which are known in the art, and hence are represented in Fig. 1 as blocks for purposes of simplicity.

Terminal 70 is adapted for application of trigger pulses to multivibrator 71. The operation of this multivibrator is dependent on disabling gate generator 72 which is connected to it. Upon being triggered by a pulse applied to terminal 73, generator 72 applies a gate pulse to multivibrator 71 which prevents the latter from operating. The duration of this gate depends upon the setting of potentiometer 74 which is connected between a point of positive potential and ground.

The trailing edge of the rectangular pulse output of multivibrator 71 is differentiated and applied to the wide gate generator 75. The output of generator 75, a rectangular voltage pulse of positive polarity, is impressed through resistors 76, 29, and 31 onto grids 30 and 32 of coincidence tubes 15 and 18. The leading edge of this wide gate is used to trigger sloping gate generator 78. This circuit generates a voltage pulse of which at least a portion varies substantially linearly with time. This gate is amplified in a push-pull amplifier 79, the purpose of which is to provide in addition to the original sloping gate a similar gate which is opposite in polarity. One gate is applied to grid 22 of tube 15 through resistors 80 and 21, while the other gate is impressed through resistors 81 and 25 onto grid 26 of tube 18.

Differential amplifier 83 compares the potentials existing on anodes 35 and 39 and amplifies any differences between them, and velocity circuit 84 converts the output of amplifier 83 from periodic pulses into a steady voltage which is substantially proportional to the amplitude of the pulses. This voltage is fed to the sloping gate generator, and also appears at output terminal 85. To this terminal can be connected an indicating device to permit observation of the amount of voltage being fed back to sloping gate generator 78.

Under normal operating conditions terminal 5 has impressed on it the output of a radio receiver consisting of positive video signals. These signals represent the modulation envelope of radio frequency energy radiated by a fixed radio beacon as has been described hereinabove. Arriving at terminal 5 in the form of voltage pulses in a coded sequence, the video signals pass down delay line 6, which translates the time interval between successive pulses into a finite distance on the delay line as determined by its constants.

If, for example, the artificial line 6 has a total delay time of four microseconds and the incoming signal consists of three one microsecond pulses spaced at one microsecond intervals, when the second pulse has arrived at terminal 5, the first pulse has travelled halfway down the line; after four microseconds have elapsed, the third pulse is on terminal 5, the second pulse is halfway down the line and the first pulse has completed its transit of the line. Therefore, taps 8, 9, and 10 may be connected respectively at the beginning, the center, and the end of delay line 6 so that there will be a time when the three taps are simultaneously raised in potential.

Delay line 6 is terminated by resistor 7 in its characteristic impedance so that reflections from the end of the line will not occur to cause operation of the circuit at the wrong time.

Clearly, the arrangement of taps 8, 9, and 10 need not be as described in the above example, but can be altered as desired to correspond to a particular coding sequence. Also, the delay time of line 6 may be any suitable value.

Each of taps 8, 9, and 10 is connected to one or more grids in each of coincidence tubes 15 and 18. The cathodes 61 and 62 of these tubes are maintained at a positive potential by current flowing through cathode resistor 60. Hence, before conduction can occur in either coincidence tube, the grids must be raised to potentials roughly of the order of that on the coincidence tube cathodes. Positive voltage pulses must exist at each of taps 8, 9, and 10 for this condition to obtain.

There is a possibility that pulses longer in duration than the delay time introduced by artificial line 6 may be passed through the radio receiver which precedes the circuit shown in Fig. 1 and be impressed on terminal 5. In this case when the initial portion of such a pulse reaches tap 10, succeeding portions of the pulse will be present at taps 8 and 9. The same result may be caused by a series of very closely spaced pulses or by a combination of long and short pulses. The effect of these conditions is the same as if separate short pulses in the correct code sequence were on line 6. However, only in the latter case it is desired to have the coincidence circuit operate. Hence a disabling circuit is employed to render the coincidence circuit inoperative unless precisely the proper signal is applied.

In this circuit a double triode 47 is used in a cathode follower connection, plates 55 and 56 being tied together, as are cathodes 57 and 58. Grids 46 and 51 are brought respectively to taps 11 ad 12 which are on delay line 6 but displaced from taps 8, 9, and 10. Cathode resistor 60 also functions as a cathode resistor for coincidence tubes 15 and 18. If tap 11 or tap 12 or both are raised in potential, the corresponding grid or grids in tube 47 will also be raised. This increases the current through tube 47 and hence through resistor 60. The increased IR drop across this resistor so elevates the potential of cathodes 61 and 62 that an increment of positive voltage appearing at taps 8, 9, and 10 and applied to the grids of coincidence tubes 15 and 18 is effectively nullified, preventing conduction in these tubes. Thus an additional safeguard is provided against actuation of the circuit by signals of the wrong sort.

Assuming that a coded signal for which taps 8, 9, and 10 are set up exists on delay line 6, the coincidence tube disabling circuit will be inoperative and positive voltage pulses will appear simultaneously on grids 13, 14, 22, and 30 of tube 15 and on grids 16, 17, 26, and 32 of tube 18.

The presence of these pulses alone, however, is not sufficient to render the coincidence tubes conductive. The addition of another positive voltage pulse, the wide gate, which is longer in duration than the pulses which make up the coded signal, is necessary. To obtain this wide gate, trigger pulses which are generated externally to the circuit shown in Fig. 1 and which are separated by a predetermined time interval which is related to linear distance, in one embodiment approximately ten miles, by the velocity of propagation of electromagnetic waves, are applied to terminal 70 and may be used to trigger off multivibrator 71. The latter, however, is controlled by disabling gate generator 72 which generates a substantially rectangular voltage pulse initiated by a trigger applied to terminal 73 and terminated after a length of time determined by the setting of potentiometer 74. While this pulse is impressed on multivibrator 71, the latter is incapable of operation. After termination of the disabling pulse, the next trigger pulse arriving on terminal 70 will actuate multivibrator 71. To differentiate between the trigger pulses on terminals 70 and 73, the former will hereinafter be termed "range trigger pulses" and the latter "master trigger pulses."

Since a master trigger pulse on terminal 73 will customarily be synchronized with one of the range trigger pulses on terminal 70 and with an interrogating signal radiated from the mobile transmitter, the leading edge of the pulse output of multivibrator 71 will be delayed behind the master trigger by a time equivalent to an integral increment of range. Potentiometer 74 is adjusted so that this increment is approximately the range to a preselected beacon transmitter. The relatively sharp leading edge present in the pulse output of multivibrator 71 is then used to trigger wide gate generator 75. A differentiator stage of any desirable type may be inserted between multivibrator 71 and gate generator 75 to form a pulse of short duration from the leading edge of the output of multivibrator 71 in order to obtain more positive triggering action.

Wide gate generator 75, being thus actuated, produces a positive-going voltage pulse which is a predetermined number of "miles" long. That is, the duration of this pulse, or gate, is such that an interrogating signal can travel a certain number of miles, elicit a response from a fixed navigational transmitter, and the response will return to the interrogator before the termination of the gate. The maximum distance at which the fixed transmitter can be located is limited by the gate duration.

Sloping gate generator 78 is triggered simultaneously with wide gate generator 75, producing a voltage pulse with a sloping trailing edge. The duration of this pulse is variable and is controlled by a voltage fed into generator 78 from velocity circuit 84. A type of circuit known in the art as a phantastron is well adapted for use as the sloping gate generator and has been used as such in one embodiment of my invention.

The pulse output of gate generator 78 is applied to sloping gate amplifier 79, which, being of the push-pull type, has an output two waveforms which are similar but inverted with respect to each other. One is substantially the same as the output of sloping gate generator 78 while the other is an inversion of the first. One of these gates, for example the positive-going one, is applied to grid 22 of coincidence tube 15, while the other, which in this case will be the negative-going gate, is impressed on grid 26 of coincidence tube 18. These gates are not necessary for conduction in the coincidence tubes; their purpose is to give automatic range search and indication.

Assuming now that coded pulses are being fed to delay line 6, and trigger pulses, as described hereinbefore, appear on terminals 70 and 73, the operation of the present invention will be summarized. Having an approximate knowledge of his position with relation to a given fixed navigational transmitter, the navigator adjusts potentiometer 74 until the length of the pulse applied to multivibrator 71 by disabling gate generator 72 corresponds to a distance equal to or less than twice his estimate of the range to the desired fixed transmitter. An interrogating signal is sent out by the ship or plane, and as this signal is transmitted, a master trigger is applied to terminal 73 and a range trigger is applied to terminal 70. Disabling gate generator 72 prevents multivibrator 71 from being triggered for a length of time determined by the setting of potentiometer 74. During this period, the interrogating pulse has reached the fixed transmitter and a coded signal has been sent back in reply. If potentiometer 74 has been set properly, the disabling pulse applied to multivibrator 72 will terminate shortly before the coded signal reaches the aircraft or ship. Assuming this to be the case, multivibrator 71 is triggered by the next range trigger to arrive at terminal 70 after removal of the disabling pulse. Multivibrator 71 then operates and triggers off wide gate generator 75 which in turn actuates sloping gate generator 78.

Providing that potentiometer 74 has been set correctly, a period of time of the order of a few microseconds later the coded signal will arrive at terminal 5, pass down delay line 6 and appear at the proper grids of coincidence tubes 15 and 18 before the wide gate has terminated. When pulses derived from the coded signal and the wide gate are coexistent on the grids of tubes 15 and 18, conduction will occur, the amount of conduction in each tube depending upon the instantaneous value of the sloping gates at the time of conduction. A portion of one of these gates increases substantially linearly with time, while a corresponding portion of the other decreases in the same way, the circuit being so designed that at one point the gates are equal in potential. If conduction takes place in coincidence tubes 15 and 18 prior or subsequent to this point, one tube will conduct more heavily than the other.

Current flow in the coincidence tubes causes a voltage drop in load resistors 36 and 40, the amount of drop in each being proportional to the anode current in the corresponding tube and hence to the time phase of the coded signal pulses relative to the sloping gate. Since current flows in tubes 15 and 18 in short pulses, capacitors 37 and 41 are provided to smooth the voltage drop across resistors 36 and 40. These capacitors are charged when tubes 15 and 18 conduct and discharge through resistors 36 and 40 when the coincidence tubes are non-conductive.

The voltage variations at anodes 35 and 39 are applied to differential amplifier 83, in which the two voltages are compared. If a difference exists between the two, it is amplified and applied to velocity circuit 84 which further filters out irregularities and fluctuations. The voltage output of velocity circuit 84 appearing at terminal 85 is proportional to distance, and indicating means can be attached thereto and calibrated in terms of range. The setting of potentiometer 74 affords coarse range indication, while fine indication can be obtained from terminal 85 as described above.

The range voltage is also fed back to sloping gate generator 78, acting on it in such a way as to move the sloping portion of the gate until the point of equal conduction coincides with the coded signal pulses. This does not reduce the fine range indication to zero, because a voltage must be maintained at terminal 85 to hold the sloping gate at the proper position.

In order to clarify and summarize the time relationships between the voltage waveforms that have been mentioned hereinbefore in connection with various portions of the circuit, reference is now made to Fig. 2. Curves A through F each represent a voltage variation with time. It is to be noted that these curves are drawn to the same time scale, but not necessarily to the same voltage scale. These curves are periodic in nature and slightly more than one cycle is shown in each. Curve A represents an interrogating signal radiated by a mobile transmitter. Curve B is a coded pulse sequence returned from a fixed beacon transmitter. It is assumed here that the sequence consists of three evenly spaced pulses. Curve C represents the beacon pulses as applied to the various grids of the coincidence tubes at the time of conduction. Curve D is a series of range trigger pulses spaced at regular intervals. Curve E is a master trigger pulse. Both the master trigger pulse and one of the range trigger pulses are shown coincident with the interrogating pulse shown in curve A. Curve F is the output of the disabling gate generator, consisting of a rectangular pulse with a variable trailing edge. Curve G is the output of the multivibrator which is actuated by the range trigger pulses. The relationship between curves D, F, and G shows how the disabling gate generator is used to prevent triggering of the wide gate and sloping gate generators until the beacon reply has almost reached the mobile receiver. Curve H shows the wide gate which is generated simultaneously with curve G. Curves J and K show the sloping gates as they are applied to the coincidence tubes.

Fig. 3 is an enlargement of the sloping gates, exaggerated in time scale, which have been superimposed and are shown with the gate pulse derived from the beacon reply. In this instance the sloping gates are not properly positioned with respect to the gate pulse and an error signal is derived from the coincidence circuit. As has been described hereinbefore, this error signal is applied to the sloping gate generator so as to reposition the sloping gates and this effect is shown in Fig. 4 wherein the sloping gates properly bracket the gate pulse so as to equalize conduction in the coincidence tubes.

Thus it can be seen that my invention will decode a signal from a navigational transmitter and give a direct indication of the distance between such a transmitter and a craft which is to be navigated by it.

It is to be emphasized that what has been described herein is only a preferred embodiment of the invention and I claim all modifications and adaptations therein as may fall fairly within the spirit and scope of the hereinafter appended claims.

What I claim is:

1. In a radio circuit, an artificial delay line, means for applying voltage pulses to said delay line, a plurality of multigrid vacuum tubes, means for connecting the grids of said multigrid vacuum tubes to said delay line so that when voltage pulses in a predetermined sequence pass down said delay line said grids will be simultaneously raised in potential, a first rectangular pulse generator, means for supplying to said first rectangular pulse generator trigger pulses spaced at predetermined time intervals, a second rectangular pulse generator, means for triggering said second rectangular pulse generator, means for applying the output of said second rectangular pulse generator to said first rectangular pulse generator to prevent triggering of said first generator during a predeterminable period of time, a third rectangular pulse generator, means for causing the output of said first rectangular pulse generator to trigger said third rectangular pulse generator, means for applying the output of said third rectangular pulse generator to at least one grid in each of said multigrid vacuum tubes, a fourth pulse generator of which at least a portion of the output is a substantially linear function with respect to time, means for causing the output of said third pulse generator to trigger said fourth pulse generator, means for inverting at least a portion of the output of said fourth pulse generator, means for applying the inverted voltage to at least one of said grids of one of said multigrid vacuum tubes, means for applying a further portion of the output of said fourth pulse generator to at least one grid of another of said multigrid vacuum tubes, load means connected to each anode of said vacuum tubes, a differential amplifier, means for applying voltages developed across said load means to said differential amplifier, and means for feeding back the output of said differential amplifier to said fourth pulse generator whereby the time duration of the output of said fourth pulse generator is altered in accordance therewith.

2. In a radio circuit, a pulse sequence discriminator, means for applying voltage pulses to said pulse sequence discriminator, a plurality of multigrid vacuum tubes, means for applying the output of said pulse sequence discriminator to the grids of said multigrid vacuum tubes, a first pulse generator having an output at least a portion of which varies substantially linearly with respect to time, means for inverting at least a portion of the output of said first pulse generator, means for applying said inverted voltage to at least one of the grids of one of said multigrid vacuum tubes, means for applying a further portion of the output of said pulse generator to at least one grid of another of said multigrid vacuum tubes, a second pulse generator, and means for utilizing the output of said second pulse generator to actuate said first pulse generator.

3. Apparatus in accordance with claim 2 wherein there is provided in addition a third pulse generator, and means for utilizing the output of said third pulse generator to control the actuation of said second pulse generator within predeterminable time limits.

ANDREW B. JACOBSEN.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,089,639 | Bedford | Aug. 10, 1937 |
| 2,211,942 | White | Aug. 20, 1940 |
| 2,266,401 | Reeves | Dec. 16, 1941 |

FOREIGN PATENTS

| Number | Country | Date |
| --- | --- | --- |
| 528,192 | Great Britain | Oct. 24, 1940 |